United States Patent [19]

Mahler

[11] Patent Number: 5,748,852
[45] Date of Patent: May 5, 1998

[54] FUZZY-LOGIC CLASSIFICATION SYSTEM

[75] Inventor: Ronald P. S. Mahler, Eagan, Minn.

[73] Assignee: Lockheed Martin Corporation, Bethesda, Md.

[21] Appl. No.: 762,645

[22] Filed: Dec. 9, 1996

Related U.S. Application Data

[63] Continuation of Ser. No. 308,010, Sep. 16, 1994, abandoned.
[51] Int. Cl.⁶ ..................................................... G06F 17/00
[52] U.S. Cl. ................................. 395/61; 395/3; 395/900
[58] Field of Search ................................. 395/3, 61, 900, 395/10, 76

[56] References Cited

U.S. PATENT DOCUMENTS 4,839,823  6/1989  Matsumoto ................................. 395/61
4,860,214  8/1989  Matsuda et al. ........................... 395/61
5,361,379  11/1994  White ...................................... 382/227

OTHER PUBLICATIONS

Baldwin, "Fril methodws for soft computing, fuzzy control and classification," Proceedings of the 1995 IEEE International conference on fuzzy systems, pp. 306–316 vol. 1.
Mouaddib, "The nuanced relational division," Second IEEE International conference on fuzzy systems, pp. 1419–1424 vo. 2, Apr. 1993.

Primary Examiner—Tariq R. Hafiz
Attorney, Agent, or Firm—Glenn W. Bowen

[57] ABSTRACT

Objects of unknown identity are identified through comparison with incompletely specified models in incompletely specified databases of a computer-based system. These incomplete models and databases are described by specifying suspected ambiguities in both the categories of classification and a priori frequencies of occurrence of the objects to be identified. Such ambiguities are mathematically represented as fuzzy Dempster-Shafer bodies of evidence. Accumulated pieces of evidence about an unknown object are fused using a Dempster-Shafer-like combination operation. This operation takes the state of prior knowledge in regard to the database—ambiguities in classification categories and in frequencies—into account. The operation provides the correct Bayesian probability estimate of identity (of an unknown target) if all pieces of evidence delivered to the process have been constructed as Bayesian posterior probabilities. Combinatorial explosion in the number of hypotheses in running estimates of identity are limited using a hypothesis-merging technique based on information theory determinations of similarities between hypotheses. The process provides estimates of identity by scoring running estimates against the model database.

1 Claim, 8 Drawing Sheets

FUZZY-LOGIC CLASSIFICATION SYSTEM

This is a continuation application of Ser. No. 08/308,010, filed Sep. 16, 1994, which will be abandoned by non-prosecution as of the filing date of the present application.

BACKGROUND OF THE INVENTION

1. Field of the Invention

The present invention relates to an improved computer-based system and method of classifying objects of unknown types given the existence of imperfect knowledge of those objects or their identifying characteristics. The invention permits the combination of evidence in a way which takes into account the ambiguousness and ill-defined nature of real-world, non-ideal classification databases.

2. Related Art

"Model-based classification" is the process of determining the identities of unknown objects by comparing these objects with a pre-existing database DBASE. This database consists of three parts. The first part is a list of object identities ("types"), i.e., the possible identities of the unknown object. The second part consists of a list of object features ("attributes")—i.e., physical qualities of the objects observable by sensors. The third part consists of a list of characterized attributes for each target (the "signatures" of the targets). In one possible biomedical application, for example, the types are diseases; the sensors are physicians; the attributes are disease symptoms; and the signatures are symptomatologies of the individual diseases. In one possible military application, the object types are submarines and ships; the sensors are radio and acoustic receivers; the attributes are electromagnetic and acoustic frequencies emitted from these platforms; and the signatures are sets of such frequency lines known to be caused by specific communication transmitters/radars and rotating machineries.

Under ideal conditions, a classification database would be perfect in four senses. First, the list of possible types would be exhaustively known and they would be known to be genuinely different from each other. Second, the database would contain an exhaustive list of all possible attributes which could be produced by these types. Third, for each attribute A and each type T the conditional probability $p(A|T)$ of observing A given the actual existence of T would be known from exhaustive experiment. Fourth, the prior probabilities $p(T)$ of the types (i.e., the relative likelihoods that a type T will actually be observed compared to other possible types) would be also known from exhaustive experiment.

Under such circumstances, Bayesian probability techniques are, in principle, sufficient to classify objects. For example, suppose that a sensor observes the attribute A. Then Bayes' rule allows us to calculate the "posterior probabilities"

$$p(T|A) = \frac{p(A|T)p(T)}{p(A)}$$

where $p(A)$ can be computes as a summation over all possible types: $p(A) = \Sigma_T p(A|T) p(T)$. The posterior probabilities $p(T|A)$, takes over all types T in DBASE, constitute a set of ranked hypotheses Hypo(T) and hypothesis ranks Rank(T)=$p(T|A)$ concerning the possible identity of the unknown object:

Hypo($T_1$): "object is type $T_1$"
Rank($T_1$)=truth of Hypo($T_1$)
Hypo($T_2$): "object is type $T_2$"
Rank($T_2$)=truth of Hypo($T_2$)
Hypo($T_3$): "object is type $T_3$"
Rank($T_3$)=truth of Hypo($T_3$)

and so on, where $T_1$, $T_2$, $T_3$, ... are the object types in DBASE. The highest-ranked hypothesis—that is, that type T0 such that $p(T0|A) \geq p(T|A)$ for all possible types T in the database—is the best estimate of the identity of the object which induced the observed attribute A. The same reasoning applies if we wish to combine two or more attributes to determine the type of object which most likely resulted in the observation of all of the attributes. For example, given two attributes A and B it is possible to compute the conditional probabilities $p(T|A \text{ and } B)$ for all T and thereby the type T0 which best accounts for the production of both A and B.

Real-world classification databases, however, frequently deviate from all four aspects of ideal behavior. Some types of objects may be unknown. Types may be non-distinct in reality (e.g., some types may actually be a single object, or two types actually only one). Individual attributes may not be easily distinguishable from each other. Finally, the probabilities $p(T)$ and $p(A|T)$ may be unknown because of an inability to perform experiments in an exhaustive manner. For example, many diseases are not unambiguously distinguishable from each other (they may be the same, or they may be a family of diseases in which the individual diseases have been incorrectly taxonomized). Disease symptoms may be imperfectly characterized or difficult to uniquely identify. Likewise, the probabilities of occurrence of diseases and symptoms are usually not known with any degree of accuracy.

Many alternative "non-Bayesian" classification algorithms, most notably those based on Dempster-Shafer and/or fuzzy-logic methods, have been devised to deal with such non-ideal situations. Some algorithms combine both the Dempster-Shafer and fuzzy-logic methodologies, resulting in "fuzzy Dempster-Shafer" classification algorithms. Such systems permit the combination of attribute evidence even if attributes are not exhaustively characterized and even if probabilities are not available.

In the Bayesian approach, clear-cut alternative posterior hypotheses are explicitly constructed in the form of a probability ranking Rank(T)=$p(T|A)$ (over all T in DBASE). The Dempster-Shafer approach, on the other hank, allows users to subjectively specify a possibly non-exhaustive list of possibly overlapping posterior hypotheses in the form of a so-called "body of evidence":

Hypo($A_1$): "object satisfies $A_1$"
Rank($A_1$)=belief in Hypo($A_1$)
Hypo($A_2$): "object satisfies $A_2$"
Rank($A_2$)=belief in Hypo($A_2$)
Hypo($A_3$): "object satisfies $A_3$"
Rank($A_3$)=belief in Hypo($A_3$)
...
...
Hypo($\theta$): "object can be anything"
Rank($\theta$)=belief in Hypo ($\theta$)

where $A_1, A_1, A_3, \ldots$ are attributes and where $\theta$ is the subset consisting of all types in DBASE. In assigning a nonzero value to Rank ($\theta$), the user is including the possibility that the evidence about the unknown object is completely in error.

In the Bayesian approach, evidence consisting of ranked hypotheses $p(T|A)$ and $p(T|B)$ are combined by explicitly computing p(T|A and B). In the Dempster-Shafer approach, by way of contrast, two posterior bodies of evidence are pooled using an explicit rule of combination.

Unfortunately, algorithms of Dempster-Shafer and/or fuzzy-logic type generally ignore prior knowledge altogether. While real-world databases are rarely ideal, it is also rare that no knowledge whatsoever is available about prior probabilities. In addition, often there is some information available concerning the possibility that certain object types may be the same or may be partially the same.

SUMMARY OF THE INVENTION

A. High-Level Description

The present invention is a computer-based system and method that takes all four kinds of non-ideal database behavior into account. Unlike ordinary fuzzy Dempster-Shafer classification systems, the present system allows non-ideality in classification categories (i.e., types) and in prior probabilities p(T). In particular, it permits users to specify subjective beliefs in the degree to which classification categories are distinct or non-distinct, and in how likely they are with respect to each other. This knowledge can be specified in the same way as Bayesian prior probabilities p(T). The result is improved ability to classify unknown objects due to the addition of the prior knowledge normally omitted from conventional non-Bayesian classifiers.

Use of the present invention presumes that a specific classification database, DBASE, has been defined. Users of the present invention, as in the Bayesian approach, must specify at the outset their subjective belief concerning the state of prior knowledge in regard to DBASE. Users are asked to specify which subsets S of DBASE they believe may have the following property: All of the types in S may be actually the same type. They are asked to specify the degree to which they believe that the elements of S are actually a single type. They are also asked to specify their subjective understanding of how likely it is that some types will occur more frequently than others. The algorithm uses this information to construct a non-negative real number $\pi(S)$ to each subset S of types in DBASE in such a way that these numbers sum to one: $\Sigma_T \pi(T)=1$. (Alternatively, this $\pi$ can be defined directly by the user).

Suppose now that sensors/operators supply two attributes A1 and A2 (or more) which seem to originate with the same observed object. An estimate of the degree to which an operator believes that the attribute was actually observed is also supplied, in the form of a real-number ranking between 0 and 1. Then the algorithm converts them into the form of a fuzzy Dempster-Shafer body of evidence. The algorithm computes an "agreement" number $\alpha(A1,A2)$ which determines how likely it is that A and B were produced by the same object. If $\alpha(A1,A2) > \tau$ for some threshold number $\tau > 1$ then the attributes A and B were likely produced by the same object. They are said to "agree." If $\alpha(A1,A2) < \tau^{-1}$ on the other hand, then the attributes A1 and A2 were likely produced by different objects. They are said to "disagree."

If bodies of evidence B and C agree then they may be combined into a composite body of evidence $B*_\pi C$. If B has m hypotheses and C has n hypotheses then $B*_\pi C$ will have as many a m×n hypotheses. These new hypotheses will in general be more sharply constrained than the hypotheses of B or C, in the sense that the rank(s) of the top-ranked hypothesis/hypotheses in the original bodies of evidence B and C.

This process of combination is repeated recursively, in the following sense. Suppose that at time t there is constructed, in previous steps, a running estimate (a composite body of evidence) $D|_t$ from previous incoming bodies of evidence. Suppose that, at a new time $t+\Delta t$ (after a time delay $\Delta t$) the system receives new information about the unknown target in the form of a new body of evidence $B|_{t+\Delta t}$. The system uses the agreement function to determine the degree of agreement between the new information $B|_{t+\Delta t}$ and the running estimate $D|_t$. If they agree sufficiently, the system combines them to get the current, or updated, running estimate:

$$D|_{t+\Delta t} = D|_t *_\pi B|_{t+\Delta t}$$

However, at each step in this recursive combination process, the number of new hypotheses increases, in general, as a product. Thus as new information is collected and combined, the number of hypotheses tends to increase exponentially. This proliferation of hypotheses will quickly exceed available computer memory storage of the system.

This problem is addressed by the next step of the process-system, called a "squeeze" operation. The purpose of the squeeze operation is to keep the number of hypotheses in the running estimate limited to no more than a fixed number, say $N_{hyp}$. The squeeze operation is an information-theory technique which compares the hypotheses in the running estimate with each other and determines which ones are most similar. Suppose that the running estimate $D|_{t+\Delta t}$ has d hypotheses. If Squeeze denotes the squeeze operation, then Squeeze($D|_{t+\Delta t}$) is a new body of evidence with d−1 hypotheses. Those two hypotheses of $D|_{t+\Delta t}$ which are most similar (in the sense that they contain approximately the same information) have been merged by Squeeze into a single hypotheses. The squeeze process is then applied to the squeezed body of evidence. Repeating the process a number of times, the original running estimate $D|_{t+\Delta t}$ is replaced by a new running estimate $D'|_{t+\Delta t}$ which has no more than $N_{hyp}$ hypotheses. In this way, combinatorial explosion is prevented.

B. Low-Level Description

A lower-level summary of the present invention will now be presented. To complete the summary description of the invention, it is necessary to mathematically define the following quantities: the agreement function '$\alpha$', the composition operation '$*_\pi$', and the squeeze operation Squeeze.

To define agreement, one first needs to construct the "prior belief measure" $\beta$. This function is defined by $$\beta(S) = \sum_{T \subseteq S} \pi(T)$$

where the summation is taken over all fuzzy subsets T of S such that $\pi(T) \neq 0$. Given this, one defines the "agreement function" $\alpha$ as follows. Let B and C be two bodies of evidence. Let $P_1, \ldots, P_m$ be the fuzzy hypotheses of B and let $Q_1, \ldots, Q_n$ be the fuzzy hypotheses of C (Fuzzy hypotheses are fuzzy subsets). Then the agreement between B and C is defined by $$\alpha(B,C) = \sum_{i=1}^{m} \sum_{j=1}^{n} \text{Rank}(P_i)\text{Rank}(Q_j) \frac{\beta(P_i \text{ and } Q_j)}{\beta(P_i)\beta(Q_j)}$$

This defines the agreement function.

If the bodies of evidence B and C are found to be in sufficient agreement, then they must be combined. The composite body of evidence $B*_\pi C$ is defined as follows. There are m×n hypotheses in $B*_\pi C$. These are defined to be:

$Hypo_{11} = P_1$ and $Q_1$
$Hypo_{12} = P_1$ and $Q_2$
...
$Hypo_{1n} = P_1$ and $Q_n$
$Hypo_{21} = P_2$ and $Q_1$
$Hypo_{22} = P_2$ and $Q_2$
...
$Hypo_{2n} = P_2$ and $Q_n$
...
$Hypo_{m1} = P_m$ and $Q_1$
$Hypo_{m2} = P_m$ and $Q_2$
...
$Hypo_{mn} = P_m$ and $Q_n$ Likewise, the ranks of these hypotheses are defined to be:

$$Rank(Hypo_{ij}) = Rank(P_i)Rank(Q_j)\frac{\alpha(P_i, Q_j)}{\alpha(B, C)}$$

Combining evidence in this manner is consistent with Bayesian probability in the following sense. Suppose that both of the bodies of evidence B and C are Bayesian, in the sense that all of the hypotheses in both have the general form Hypo(T): "object is type T"
Rank(T)=belief in Hypo(T)

Suppose in addition that complete Bayesian knowledge of prior conditions is available. Suppose that the numbers $Rank_B(T)$ and $Rank_C(T)$ for the bodies of evidence B and C respectively have been computed as posterior probabilities Rank(T)=p(T|A1) and Rank(T)=p(T|A2), respectively, for some attributes A1 and A2. Then the hypotheses of the composite body of evidence $B*_\pi C$ will also all be of the general Bayesian form Hypo(T): "object is type T"
Rank(T)=belief in Hypo(T)

Moreover, the ranks Rank(T) of the hypotheses of $B*_\pi C$ will agree with those computed using Bayesian probability: Rank(T)=p(T|A1 and A2).

Finally, the details of the squeeze operation Squeeze will now be described. Suppose that B is a body of evidence with s hypotheses. Then the purpose of the squeeze is to construct a smaller body of evidence B' with s−1 hypotheses which is "similar" to B in the sense that B' has approximately the same information content as B. This is accomplished as follows. Let $P_1, \ldots, P_m$ be the hypotheses of B and $m_1, \ldots, m_s$ their corresponding ranks. From B construct the body of evidence $B_{ij}$ by striking out the $i^{th}$ and $j^{th}$ hypotheses, and then inserting the following single hypothesis $Q=P_i$ or $P_j$ in their place, where 'or' denotes the logical OR operation. Then, the system determines which of the $B_{ij}$ involves the least loss of information, compared to all of the others, by minimizing the entropy with respect to B. The entropy is defined as $$\epsilon_B(B_{ij}) = -\Sigma \alpha_{uni}(B,T) ln(\alpha_{uni}(B_{ij},T))$$

where the summation is taken over all types T in DBASE such that $\alpha_{uni}(B,T) \neq 0$. Here $\alpha_{uni}$ is the "uniform" agreement function defined by:

$$\alpha_{uni}(B,T) = \sum_{t=i}^{s} m_t \frac{N(P_i, T)}{N(P_t)}$$

where $N(P_i)$ denotes the number of entries in DBASE which are consistent with $P_i$, and where $N(P_i,T)=1$ if entry T in DBASE satisfies hypothesis $P_i$ and $N(P_i,T)=0$ otherwise.

Once the numbers $\epsilon_B(B_{ij})$ have been calculated, then the $B_{ij}$ which corresponds to the minimal value of $\epsilon_B(B_{ij})$, taken over all $i \neq j$, is defined to be the "squeeze" Sq(B) of B. (If more than one $B_{ij}$ minimizes $\epsilon_B(B_{ij})$ then any one of the minimizing hypotheses may be chosen.)

This process may then be repeated on Sq(B), then on Sq(Sq(B)), and son on. Each time, the number of hypotheses is reduced by one and the process thereby reduces the size of B to a body of evidence which has whatever number of hypotheses that a user desires.

In the process, the quantity $\epsilon_B(B_{ij})$ is approximated using the formula $$\epsilon_B(B_{ij}) = (m_i + m_j) \ln\left(\frac{m_i + m_j}{N_{ij}}\right) - m_i\left(\frac{m_i}{N_i}\right) - m_j\left(\frac{m_j}{N_j}\right)$$

for all $i \neq j$ and $ij=1, \ldots, s$. Here, $N_i$ is the number of entries in DBASE which are consistent with the hypotheses $P_i$, and $N_{ij}$ is the number of entries in DBASE which are consistent with the hypotheses $P_{ij}=P_i$ or $P_j$ (for $i \neq j$).

BRIEF DESCRIPTION OF THE DRAWINGS

Eight figures describe the invention in operational flow-chart form (except FIG. IA), which can be implemented as software of firmware on a computer system.

FIG. IA is a block diagram depicting an example environment 100 of the present invention.

FIG. I shows the top-level algorithmic structure of the invention. The blocks in this diagram are numbered from "1" to "9" and then one more numbered as "11".

Figure 1:
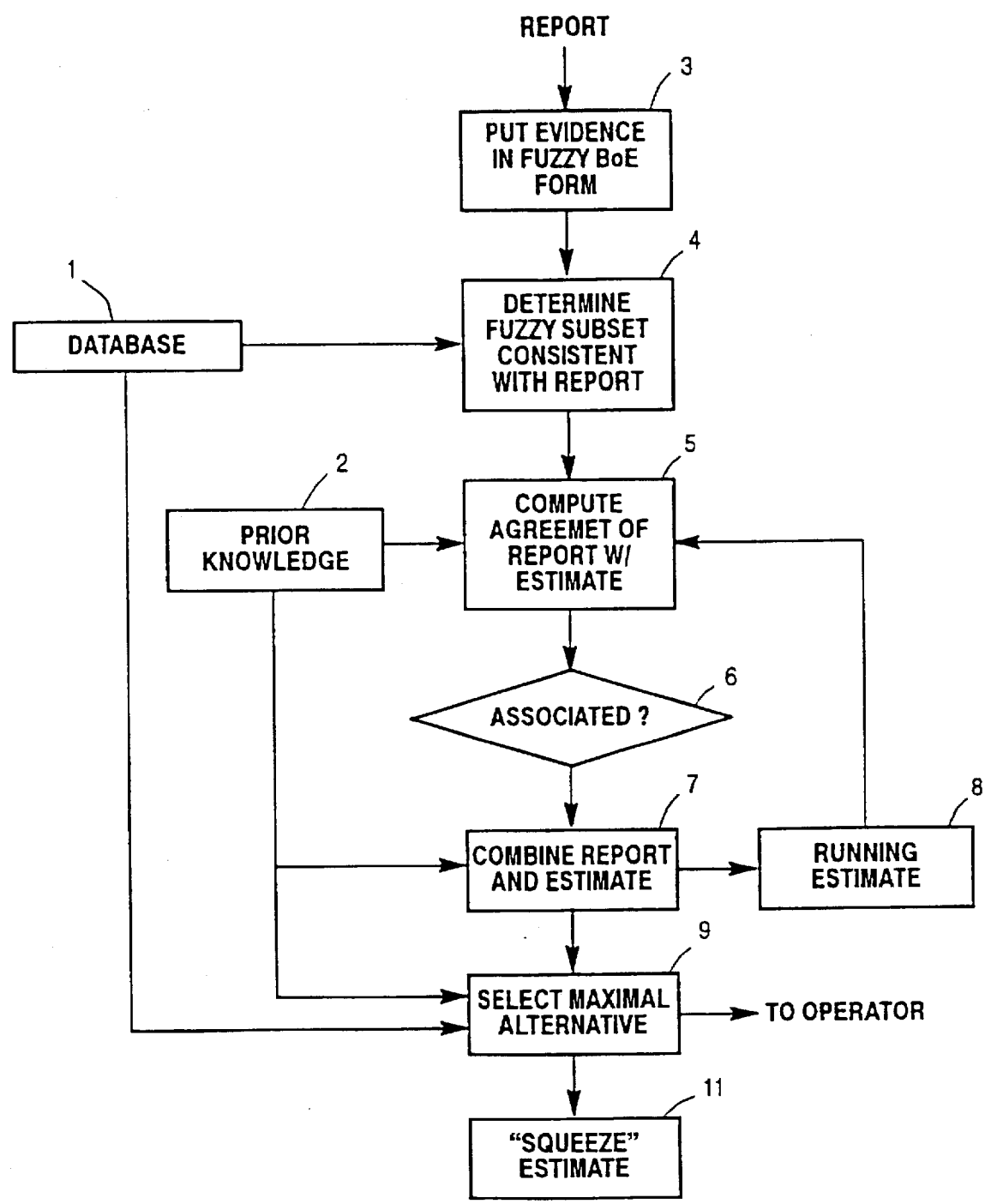
Figure 1A:
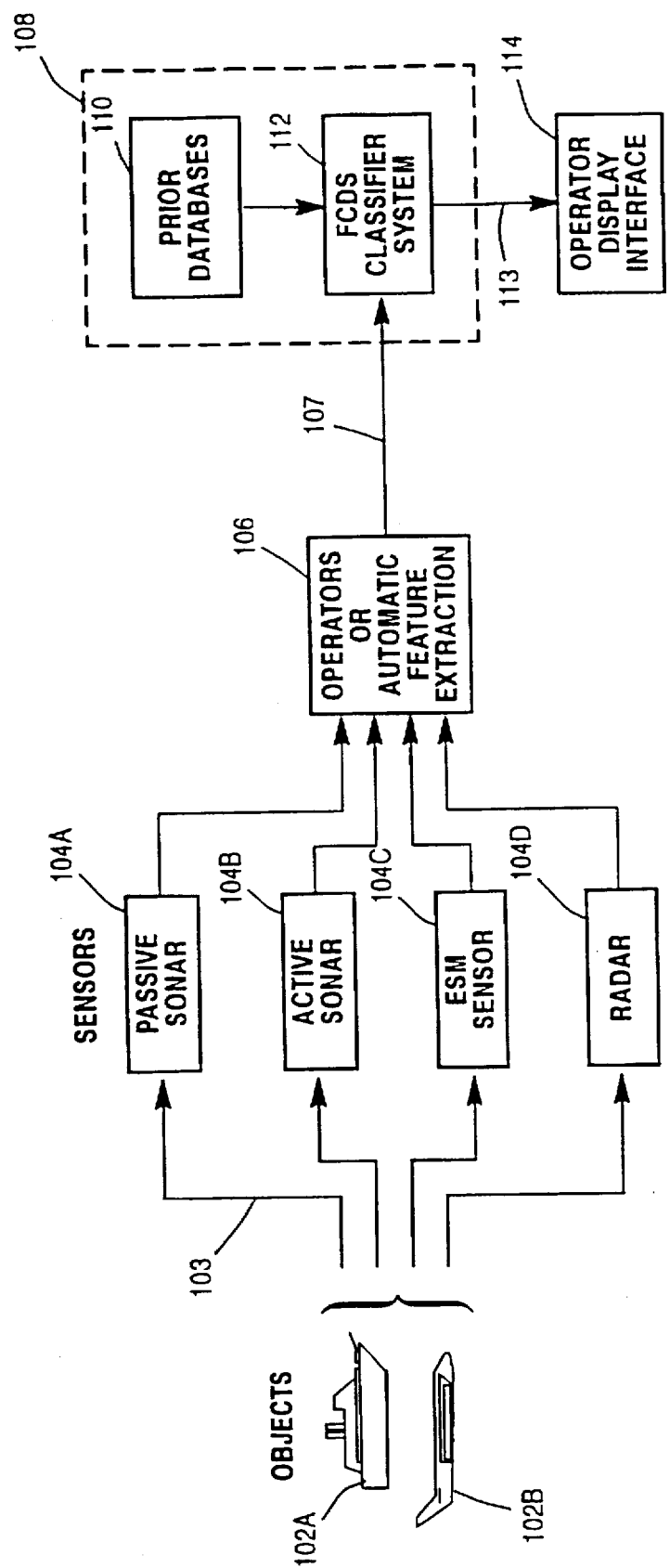
Figure 2:
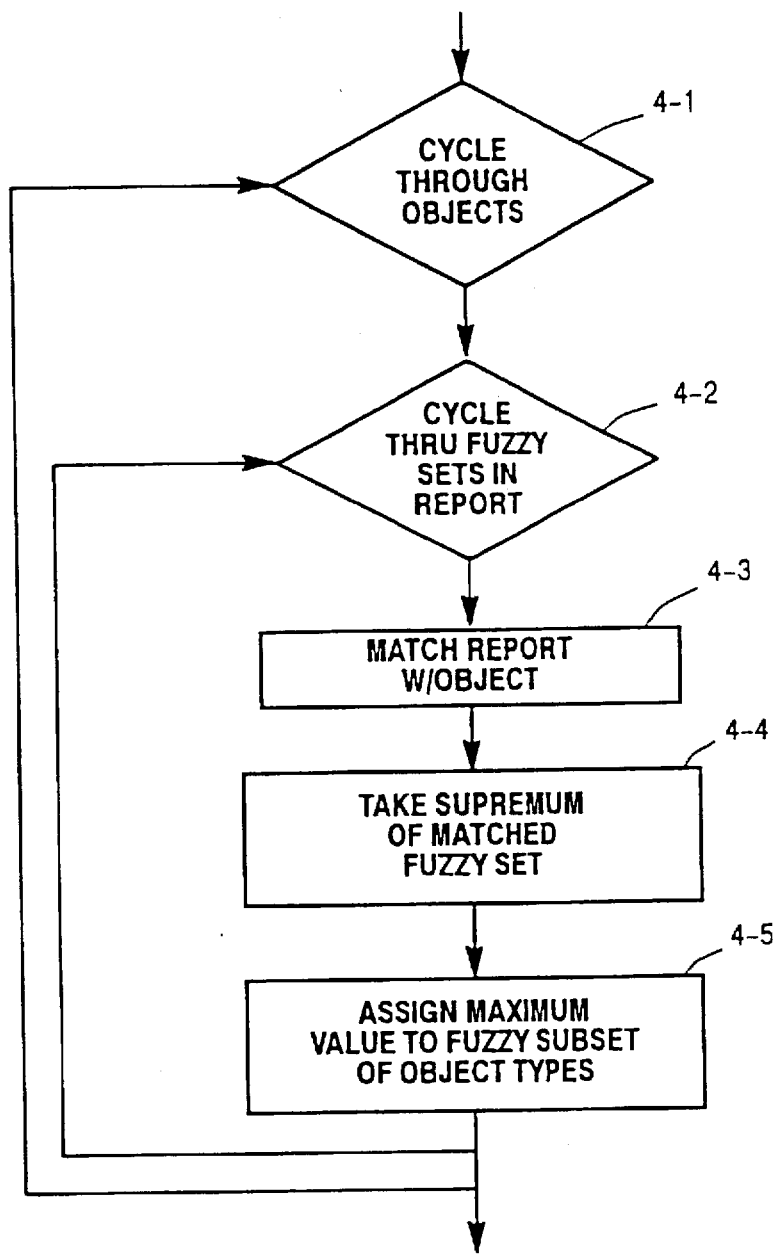
Figure 3:
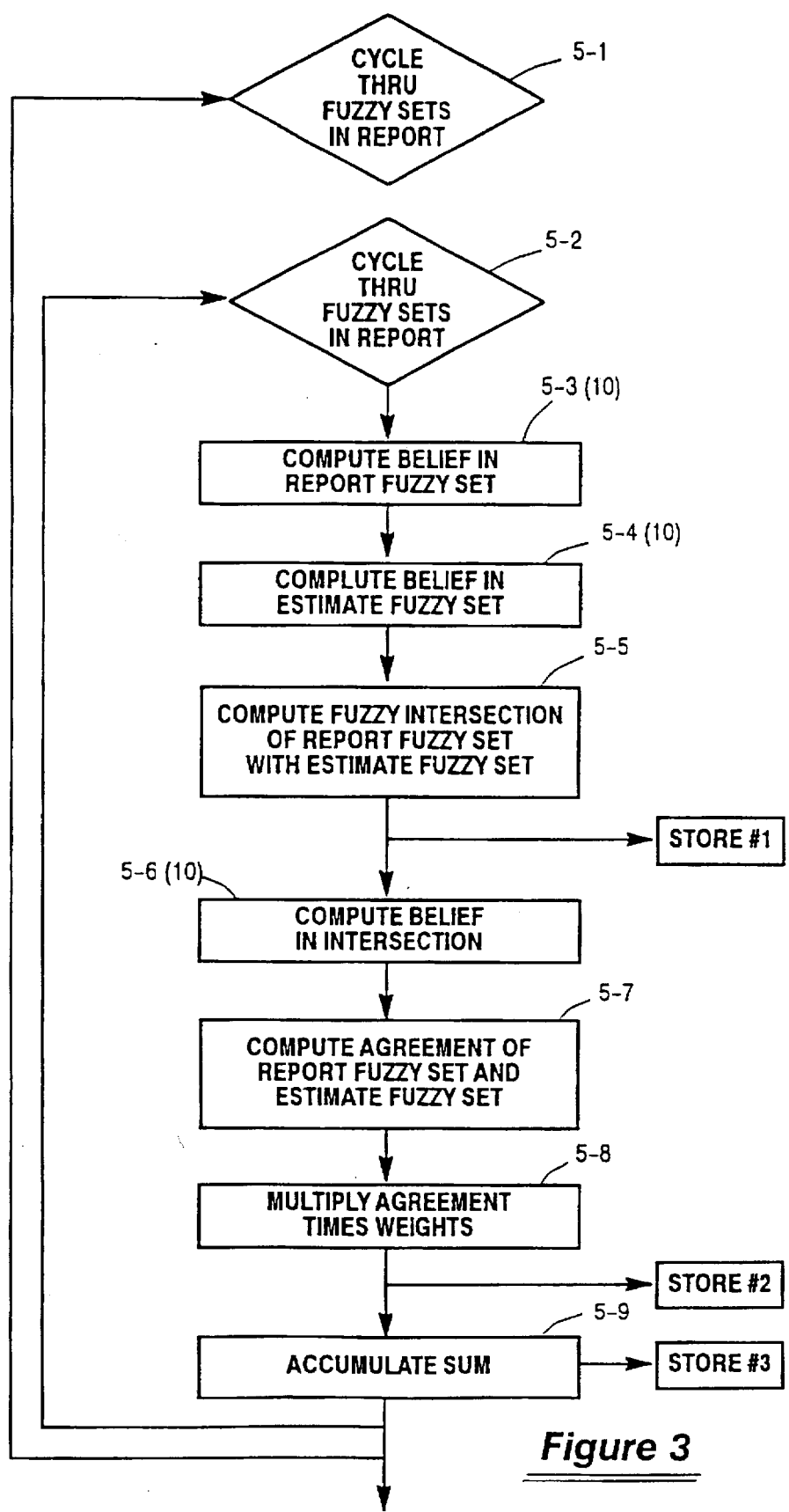
Figure 4:
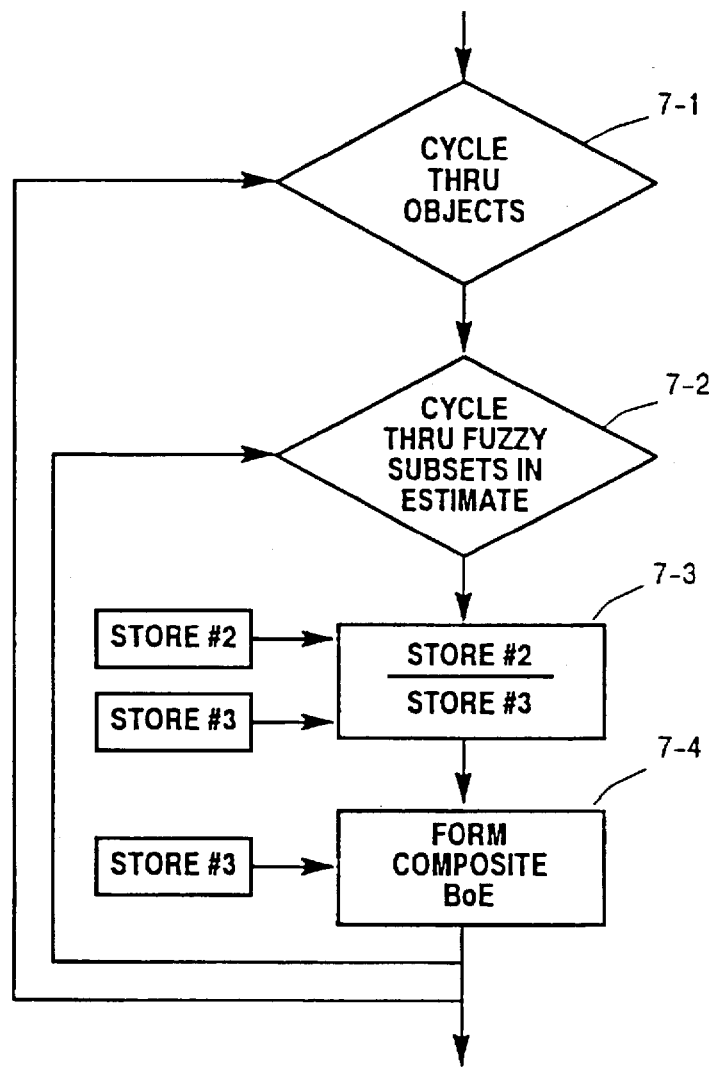
Figure 5:
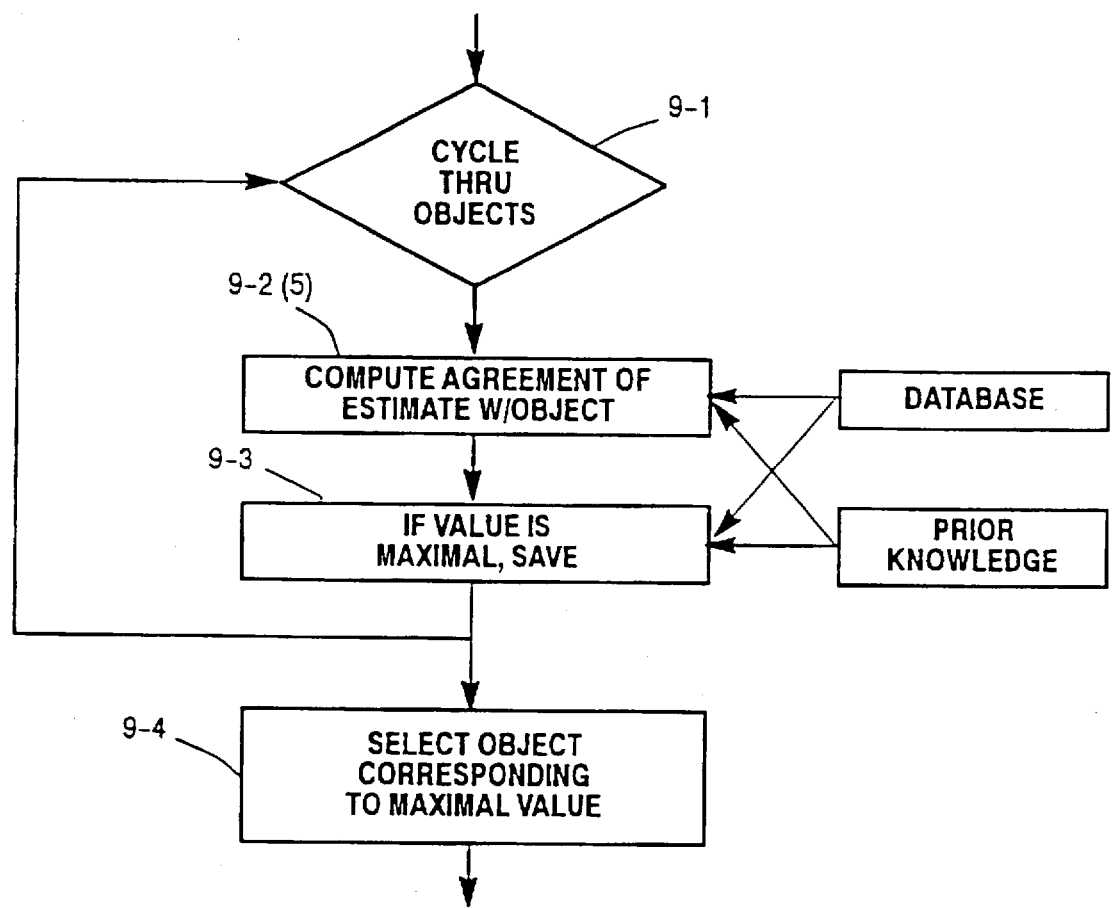
Figure 6:
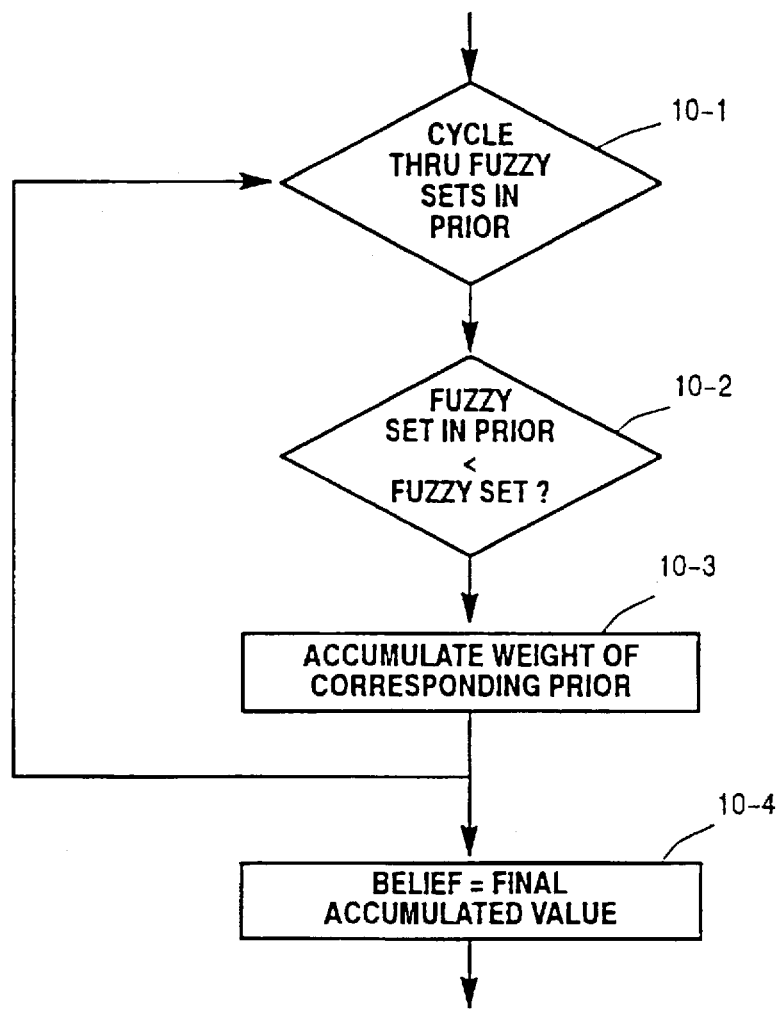
Figure 7:
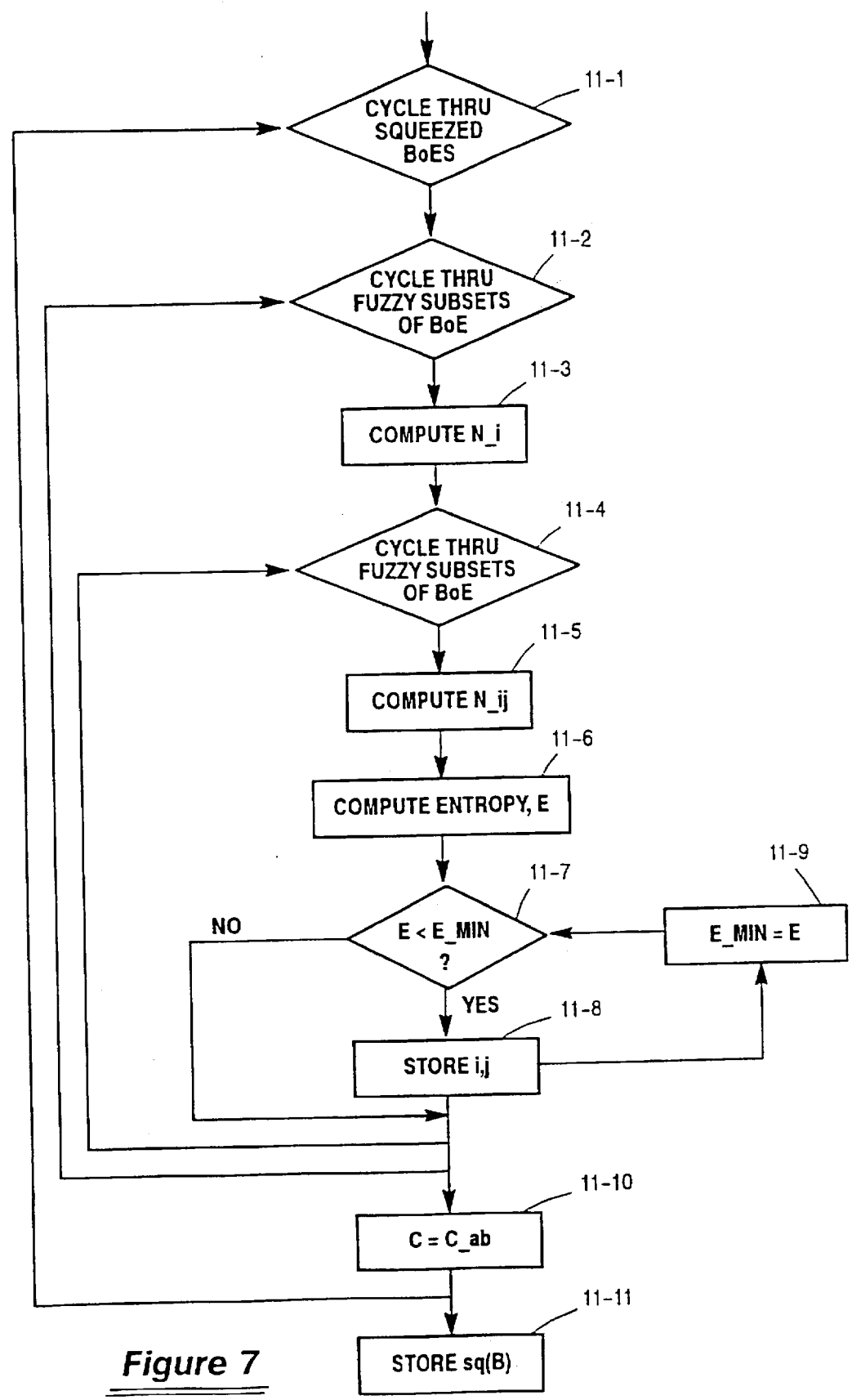

FIG. 2 through 5, and FIG. 7, refer to blocks in FIG. I as follows:

FIG. 2: operation of Block #4;
FIG. 3: operation of Block #5;
FIG. 4: operation of Block #7;
FIG. 5: operation of Block #9; and
FIG. 6: operation of Block #10;
FIG. 7: operation of Block #11.

In FIG. 3, one of the blocks is numbered as "10". FIG. 6 describes the operation of Block #10 of FIG. 3. Likewise, in FIG. I one of the blocks is numbered as "11". FIG. 7 describes the operation of Block #11 of this Figure.

DETAILED DESCRIPTION OF THE PREFERRED EMBODIMENT

Environment

FIG. IA is a block diagram depicting an example environment 100 of the present invention. Referring to FIG. IA, electromagnetic and/or acoustic signals 103 from military or commercial platforms 102 such as ships 102A, airplanes 102B, and submarines (not shown) are collected by various types of sensors 104, which are capable of detecting identity (attribute) information. These sensors 104 include, but are not limited to: passive-acoustic sonobuoys, hull-mounted sonars, or trailing acoustic arrays (collectively "PASSIVE SONAR" 104A); active-acoustic sonobuoys or hull-mounted sonars (collectively "ACTIVE SONAR" 104B); ESM radio-emission receivers 104C; conventual radars, imaging radars, imaging infra-red sensors (collectively "RADAR" 104D); and so on.

Once collected, acoustic and/or electromagnetic signals 103 must be processed in such a way as to extract "features"

(attributes) from them. This function is accomplished either by trained operators or by suitable automatic or semi-automatic feature extraction systems 106 (employing specified feature extraction algorithms). (Acoustic features, for example, are characteristic acoustic frequencies. Feature extraction algorithms such as line trackers are necessary in order to identify such lines.) The fuzzy-logic classification system 108–114 of the present invention accepts such feature information signal 107 and compares it to databases 110. The system 108 via the classifier system 112 also computes a running estimate of the identity of the unknown target 102, and also a current-best-guess estimate of the identity of the object 102. This current estimated identity is then released as an output 113 to and operator interface system 114, which displays it to operator(s).

Operation

This description of the operation of the present invention refers to FIGS. I through VII. In FIG. I, the overall process structure of the present invention is indicated by functional blocks labelled "1" through "11". This section first describes the over-all operation of the invention using FIG. I. Then the operation of the invention is described in more detail by referring to each of the blocks of FIG. I in turn.

Operation of the invention assumes that Block 1 and Block 2 have been specified in advance. Block 1 is a database consisting of suspected object types, their suspected characteristic attributes, and their suspected characteristic attribute signatures. Block 2 is a specification of prior knowledge in regard to both prior categories of classification and prior frequencies of occurrence of object types. The process begins when an operator inputs into the computer system a report (e.g., a report can be an analog electrical signal or a digital signal representative of some respects to the report) consisting of an attribute and a real-number estimate of its uncertainty. In Block 3, this report is encoded in the form of a fuzzy subset of whatever family of attributes to which the attribute belongs.

In Block 4, the report is transformed into a new computer-based format: a fuzzy subset of the set of object types, rather than a fuzzy subset of an attribute family. This is accomplished by comparing the report with its corresponding attribute in the signature of each object type. What results is the fuzzy subset of object types whose signatures are consistent with the report.

Once the report has been converted into this form, it is compared with the current running estimate (of the identify of the unknown object which is being observed). The purpose here is to determine whether or not the report should be associated with the current running estimate, or be interpreted as a false alarm or as a report associated with some other unknown observed object. To compare the report and the running estimate, an agreement value is computed for the two. In Block 6, an association or non-association is declared by the computer system.

In this case, in Block 7 the report is combined with the current running estimate and results in a new, or updated, running estimate. The combination is accomplished using various values stored during the generation of the agreement value in Block 5. In Block 8, the new running estimate is stored for use when a new report is received by the invention.

In Block 9, the new running estimate is used to determine which object type in the database can be regarded as the most likely source of the current received report. This is accomplished by computing agreement values (in the same way as in Block 5) of the new running estimate with each of the object types in the database. That object type which has largest agreement with the new running estimate is declared to be the best current estimate of the identity of the unknown target. This result is then displayed to the operator.

Finally, in Block 11 the new running estimate is reduced in size using an information-theory technique called the "squeeze." This reduced running estimate is the one which is actually stored for use in future operation cycles of the process.

We now turn to a more detailed description of the program flow in Blocks 1 through 9.

Block 1: Database, DBASE

The database must be specified before "normal-mode" operation of the process can commence. The database consists of three aspects. First, it consists of an array) $O_1, \ldots, O_N$ of object types—that is, a list of the possible identities which it is believed that observed unknown objects could be.

Second, it consists of an array of object characteristics ("attributes") which are believed to be observed from objects by sensors. These attributes are arranged into "attribute families"—groups of attributes which are of similar type. (For example, in a medical application basal body temperatures constitute such a family; in a military application, pulse repetition rates of radars is an attribute family.)

Third, each object type O is endowed on a prior basis with a "signature," or collection of attributes which are believed to be characteristic of the object type. Mathematically, each attribute is a fuzzy subset of the total set of possibilities available to the attribute family to which it belongs. (For example, an attribute in the family of temperature attributes is a fuzzy subset of all possible basal body temperatures. An attribute in the family of pulse repetition rate attributes is a fuzzy subset of all possible radar pulse repetition rates.) In general, in any signature there should be an attribute for every possible attribute family.

Attributes are of two types: discrete and continuous. In the case of discrete attributes (as in the family of attributes which specify the main power plants of military vehicles), the underlying possibilities consist of a finite set $Z_1, \ldots, Z_d$ of possibilities. In this case, an attribute is a fuzzy subset of the set $\{Z_1, \ldots, Z_d\}$. A fuzzy subset F of $\{Z_1, \ldots, Z_d\}$, in turn, is just an array $F_1, \ldots, F_d$ in the 'C' computer language of numbers between zero and one. The number $F_j$ specifies the degree to which the attribute possibility $Z_j$ occurs in the fuzzy set.

In the case of continuous attributes (as in the temperature or pulse repetition rate examples) fuzzy subsets are restricted to a special kind (because of computational considerations). Let $0=a_0<a_1<\ldots a_k=1$ be a fixed set of real numbers between 0 and 1. Let U be some list of objects. Then fuzzy subsets are represented in simplified form as a function whose graph is a trapezoid. That is, fuzzy subsets are specified by five positive numbers $$A = (cl, cr, h, 1/ml, 1/mr)$$

where:

cl=abscissa of bottom left corner or trapezoid cr=abscissa of bottom right corner of trapezoid h=height of trapezoid (=$a_j$ for some j)

−ml=slope of left side of trapezoid mr=slope of right side of trapezoid where it is assumed that $cl \leq cr$, that $-ml$ is negative, and that $$h\left(\frac{1}{mr} + \frac{1}{ml}\right) \leq cr - cl$$

(this ensures that the two sides do not intersect in a point whose ordinate is less than the height).

Block 2: Prior knowledge

Prior knowledge must be specified before "normal-mode" operation of the algorithm can commence. Prior knowledge is stored as a fuzzy body of evidence on the set $\{O_1, \ldots, O_N\}$ of object types. That is the prior consists of computer-language array $P_1, \ldots P_e$ of fuzzy subsets of $\{O_1, \ldots O_N\}$; together with computer-language array $P_1, \ldots P_e$ of numbers between zero and one (which sum to one). Each fuzzy subset $P_j$, in turn, is computer-language array $P_{j1}, \ldots P_{jN}$ of numbers between zero and one. Prior knowledge is specified as follows. In a "set-up mode," the invention asks the operator to input an array $q_1, \ldots q_N$ of nominal prior frequencies for the object types. That is, $q_j$ should be a subjective estimate of the frequency with which the object type $O_j$ is believed to actually occur in the given application. The numbers $q_1, \ldots q_e$ should be between zero and one and should sum to one. Next, the operator (or user) is asked to input a list of fuzzy subsets of $\{O_1, \ldots, O_N\}$, together with a weight (a number between zero and one) for each fuzzy subset. Each fuzzy subset is entered as an array $Y_1, \ldots, Y_N$ of numbers between zero and one. Suppose that $Y_1, \ldots, Y_k$ are the nonzero numbers in the array $Y_1, \ldots, Y_N$. Then $Y_1, \ldots, Y_k$ is a statement of the operator's belief that the corresponding object types $O_1, \ldots, O_k$ may actually be the same, and to what degree. The weight y associated with the fuzzy subset $Y=(Y_1, \ldots, Y_N)$ is the operator's subjective estimate of his total belief that $O_1, \ldots, O_k$ may be the same.

For example, suppose that there are four object types $O_1, O_2, O_3, O_4$ and suppose that the operator specifies the array $Y=(0,0,1,\frac{1}{2})$ with weight $y=0.2$. Then the operator is expressing a belief that the objects $O_3$ and $O_4$ may be the same, but that $O_3$ is more likely to be the "correct" object than $O_4$. However, on a scale of one to ten, the operator believes that the likelihood of $O_3$ and $O_4$ being the same (in the manner specified) is relatively remote: only two in ten.

Given this information, the invention then computes the prior fuzzy body of evidence. Let $P_1, \ldots, P_e$ be the fuzzy subsets which have been entered by the operator. Let $y_1, \ldots y_p$ be the corresponding weights specified by the operator. These are adopted as the fuzzy subsets of the prior body of evidence (Recall that by "fuzzy subset" we mean a computer-language array of the form previously described). The weights $P_1, \ldots P_e$ which correspond to these fuzzy subsets are computed by the invention using the formula:

$$P_j = \frac{y_j \mu(P_j)}{\sum_{k=1}^{e} y_k \mu(P_k)}$$

where the quantity $\mu(P_j)$ is defined by:

$$\mu(P_j) = \sum_{i=0}^{N} q_i P_{ji}$$

The numbers $P_1, \ldots P_N$ are between zero and one and sum to one, as indicated.

Block 3: Put input report in fuzzy-set form

Input data to the invention consists of "reports," which are machine- or operator-supplied descriptions of observed attributes which are believed to be associated with an unknown object. These attribute reports must be translated into computerized fuzzy-subset form in order to be processed. This accomplished by asking the operator a sequence of questions concerning the nature of the observed attribute. These include:

The attribute family to which the attribute belongs $m \geq 0$ The subjective belief that the observed attribute belongs to the specified family of attributes $n \geq 0$ The subjective belief in the existence of the attribute itself $B \geq 0$ ("Bandwidth"), the degree of belief that attributes in the specified attribute family, similar to the observed attribute, could actually be the observed attribute From these queries, the invention constructs a fuzzy body of evidence which represents the report in a computer-processable form. The fuzzy body of evidence consists of two fuzzy subsets R and $\theta$ of the attribute family to which the observed attribute is believed to belong; and two number $m_R$ and $m_\theta$ between zero and one(which sum to one). The latter numbers are defined as $m_R = m$ and $m_\theta = 1-m$. The fuzzy subset $\theta$ is the unity fuzzy subset (i.e., an array all of whose numbers are 1).

The form which the fuzzy subset $\theta$ takes depends on whether the specified attribute family is "discrete" or "continuous." If the attribute family is discrete, it consists of a finite array $A_1, \ldots, A_d$ of possible attribute alternatives. In this case, both R and $\theta$ are arrays of the form $a_1, \ldots a_d$ where $a_j$ are numbers between zero and one. The attribute $\theta$ is just the array $1, \ldots, 1$ consisting of d copies of the multiplicative identity 1. If the attribute family is continuous, the fuzzy subset $\theta$ is defined as a trapezoid, as summarized in the description of Block 1, above. The fuzzy subset $\theta$ in this case is defined as $$\theta = (cl, cr, 1, 0, 0,)$$

where cl is chosen to be much smaller than, and cl much larger than, any attribute possibility likely to be encountered for the particular attribute family in question.

The form which the fuzzy subset R takes also depends on whether the specified attribute family is discrete or continuous. In the discrete case, the operator's specification of a "bandwidth" consists of explicit assignments of ranked numbers between zero and one to the attribute possibilities in the array $A_1, \ldots, A_d$. This array $R_1, \ldots R_d$ of numbers then defines R. In the continuous case, the specification of a bandwidth defines a trapezoid of the form $$\theta = (f-B, f+B, n, \frac{1}{2}nB, \frac{1}{2}nB)$$

Here, f is the attribute possibility which is believed to best represent the report.

Block 4: Determine fuzzy subset of entries in DBASE which are consistent with the report This section refers to FIG. II. The purpose of Block 4 is to transform the report into a more useful form. At this stage, the report consists of a fuzzy body of evidence. That is, it is a list $R_1, \ldots, R_r$ of fuzzy subsets of an attribute family, together with an array $m_1, \ldots, m_r$ of numbers between zero and one (which sum to one). A given fuzzy subset $R_j$ is an array $R_{j1}, \ldots, R_{jM}$ of numbers between zero and one. (In the process, the fuzzy body of evidence is represented as an array of arrays.) Each of the fuzzy subsets of the report belongs to one attribute family.

After conversion in Block 4, the report will have been transformed into a fuzzy body of evidence each of whose fuzzy subsets is a fuzzy subset of the set $\{O_1, \ldots, O_N\}$ of object types in the database. That is, after conversion the report consists of an array $F_1, \ldots F_r$ of fuzzy subsets of $\{O_1, \ldots O_N\}$ together with the same array $m_1, \ldots, m_r$ of numbers between zero and one (which sum to one) as occurs in the report. Each fuzzy subset $F_k$ is, in turn, an array $F_{k1}, \ldots, F_{kN}$ of N numbers between zero and one. Each fuzzy subset $F_k$ represents the fuzzy subset of object types which are consistent with the fuzzy subset $R_k$ of the original report, as follows:

$$R_1, \ldots, R_r \quad m_1, \ldots, m_r$$
$$F_1, \ldots, F_r \quad m_1, \ldots, m_r$$

For a fixed k, the number $F_{kj}$ is a measure of the degree to which the $j^{th}$ object type in the database is consistent with the fuzzy set $R_k$ of the original report.

Each object type O in the database has a signature, and each signature consists of a single attribute, in the form of fuzzy subset A of the attributes in an attribute family. There is one such fuzzy subset in the signature for each attribute family. It is an array $A_1, \ldots, A_r$ of numbers between zero and one.

The program flow consists of two nested control loops. The first loop, identified as Block 4–1, cycles through all of the object types in the database. This loop is necessary in order that the report may be compared, in turn, with the attribute of same family type in the signatures of each of the object types. The second loop, denoted 4–2, is necessary because the report consists of an array of fuzzy subsets. Each of the fuzzy subsets of the report must be compared to an attribute of the same family in the signature of the current object type O.

Assume that the computer system is comparing the report with the signature of object type $O_i$. In Block 4–3, two fuzzy subsets (one from the report, one from the signature of an object type in the database) are matched. The two fuzzy subsets belong to attributes of the same attribute family. The match consists of a fuzzy intersection $G_j=A \char`\^ R_j$ of the fuzzy attribute A in the signature with the fuzzy attribute $R_j$ of the report. That is, the match is a fuzzy subset of the attribute family—that is, an array $G_{j1}, \ldots, G_{jM}$. It is computed from the equations:

$$G_{j1}=\min\{A_1, R_{j1}\}, \ldots, G_{jM}=\min\{A_M, R_{jM}\}$$

for all $j=1, \ldots, r$. Next, in Block 4—4 the maximum value $g_j=\max\{G_{j1}, \ldots, G_{jM}\}$ of the numbers $G_{j1}, \ldots, G_{jr}$ is determined. The value $g_j$ is stored as the $i^{th}$ value of the fuzzy subset $F_j$ of the set $\{O_1, \ldots, O_N\}$: $F_{ji}=g_j$ (as indicated in Block 4–5).

Block 5: Compute agreement of report with running estimate

This section refers to FIG. III. The purpose of Block 5 is to compute, on the basis of prior knowledge, the agreement value between the current running estimate and the report computed in Block 4.

The output of Block 4 is a fuzzy body of evidence. It consists of an array $F_1, \ldots, F_r$ of fuzzy subsets of the set $\{O_1, \ldots O_N\}$ of object types in the database, together with an array $m_1, \ldots, m_r$ of numbers between zero and one (which sum to one). Likewise, the running estimate is also a fuzzy body of evidence. It consists of an array $E_1, \ldots, E_s$ of fuzzy subsets of the set $\{O_1, \ldots, O_N\}$ of object types, together with an array $n_1, \ldots, n_s$ of numbers between zero and one (which sum to one).

Block 5 is based on two control loops, 5–1 and 5–2, which cycle through the fuzzy subsets $F_1, \ldots F_r$ in the report and the fuzzy subsets $E_1, \ldots, E_s$ in the running estimate, respectively. Once inside the control loops, the computer system is dealing with a specific fuzzy subset $F_i$ from the report and a specific fuzzy subset $E_k$ from the running estimate.

Blocks 5–3 and 5–4 (also denoted as "Block 10") generate belief values $\beta(F_i)$ and $\beta(E_k)$ of the fuzzy subsets $F_i$ and $E_k$. The values of the belief functions depend on prior knowledge, and their computation is explained FIG. VI and in the discussion of Block 10, below.

Block 5—5 computes the fuzzy intersection $F_i \char`\^ E_k$ of the fuzzy subsets $F_i$ and $E_k$. That is, it computes a new fuzzy subset H of the set $\{O_1, \ldots, O_N\}$ of objects types. This fuzzy subset is an array $H_1, \ldots, H_N$ and its specific values are $$H_j=\min\{F_{ij}, E_{kj}\}$$

for all $j=1, \ldots, N$. The array H is stored, in a computer memory location (represented as "Store #1 in the diagram) for future use in Block 7, below.

Once this has been accomplished, Block 5–6 (also denoted as Block 10) computes the belief value $\beta(H)$ of the fuzzy intersection H. If $\beta(H) \neq 0$ then the quotient $$A = \frac{\beta(H)}{\beta(F_i)\beta(E_k)}$$

is computed in Block 5–7. In Block 5–8, its value is multiplied by the corresponding weight (rank) numbers of $F_i$ and $E_k$ to yield the number $$A' = m_i n_k A$$

This value is stored for future use (in Block 7) as "Store 2". It is then accumulated with previous values of A' in Block 5–9:

new accumulant=A'+old accumulant

This process is repeated over all cycles of the two control loops. At the end of it, the final value of the accumulant is stored as the value of $\alpha$(report, estimate)—that is, the agreement between the report and the current running estimate. This agreement value is stored for future use (in Block 7) as "Store #3".

Block 6: Are the report and running estimate associated?

In this section the agreement value computed in Block 5 is thresholded to determine if sufficient agreement exists between the report and the running estimate to subsequently combine them (Block 7). A threshold value TH>1 is chosen prior to input of reports. If $$\alpha(\text{report, estimate}) > TH$$

then the report and estimate are regarded as associated and thus should be combined. If on the contrary $$\alpha(\text{report, estimate}) < TH$$

then the report and estimate are regarded as not being in sufficient agreement. In this case, the report should be regarded as being due to some other unknown target, or as due to some completely unknown target.

Block 7: Compute the relative composition of report with running estimate

This section refers to FIG. IV. As a result of the computations of Blocks 5 and 6, it has been decided that the report should be combined with the current running estimate. This is accomplished by making use of values stored during the operation of Block 5. The combination is a new fuzzy body of evidence with r×s fuzzy subsets, where r is the number of fuzzy subsets in the report and s is the number of fuzzy subsets in the current running estimate.

The fuzzy subset $L_{ik}$ of the combined fuzzy body of evidence is the fuzzy intersection $L_{ik}=F_i \cap E_k$ of the $i^{th}$ fuzzy subset of the report and the $k^{th}$ fuzzy subset of the running estimate. This fuzzy subset was computed and stored in Block 5 as "Store #1" and does not have to be recomputed. Likewise, the values $$m_i n_k \alpha(F_i, E_k)$$

were computed and stored in Block 5 as "Store 2". The value $\alpha$(report, estimate) was also computed in Block 5 as "Store 3". The value is the weight (rank) value which corresponds to $L_{ik}$.

$$v_{i,k} = \frac{m_i n_k \alpha(F_i, E_k)}{\alpha(\text{report, estimate})}$$

Block 8: Store running estimate

The new fuzzy body of evidence with is computed in Block 7 is stored as the new running estimate (i.e., the old running estimate updated with the current report).

Block 9: Select maximal alternative in DBASE

This discussion refers to FIG. V. The purpose of Block 9 is to determine which of the object types $O_1, \ldots, O_N$ is the best guess as to what kind of object produced the reports which have been combined (as the running estimate) thus far. This block consists of a single control loop, 9–1, which cycles over all of the object types $O_1, \ldots, O_N$ in the database. Inside this loop, Block 9–2 (also denoted as Block 5) computes the agreement value $\alpha(O,L)$ between the object type O and the new running estimate L (as computed in Block 7). The computation of this agreement value is the same as that in Block 5.

The agreement values $\alpha(L,O_1), \ldots, \alpha(L,O_N)$ for all of the object types are stored in Block 9–3. At the conclusion of the control loop, that O such that $\alpha(L,O)$ is maximal in comparison to all of the values $\alpha(L,O_1), \ldots, \alpha(L,O_N)$ is chosen as the best current guess as to the identity of the unknown object. This value is then fed to an operator-machine interface which displays it to the operator.

Block 10: Compute belief in a fuzzy proposition

This discussion refers to FIG. VI. It describes the computation of the belief values used in the construction of the agreement value in Block 5.

Let Q be a fuzzy subset of the set $\{O_1, \ldots O_N\}$ of object types. Thus Q is an array $Q_1, \ldots Q_N$ of numbers between zero and one. In Block 2, the prior knowledge has been set forth. It is a fuzzy body of evidence. That is, it consists of an array $P_1, \ldots P_e$ of fuzzy subsets of $\{O_1, \ldots, O_N\}$ together with an array $P_1, \ldots, P_e$ of numbers between zero and one (which sum to one). Thus each $P_j$ is an array $P_{j1}, \ldots P_{jN}$ of numbers between zero and one.

Block 10 consists of a control loop (Block 10–1) which cycles through all fuzzy subsets $P_1, \ldots, P_e$ of the prior body of evidence. Within the body of the control loop, a comparison is made between the fuzzy set Q and the fuzzy subset $P_j$. This test consists of deciding whether or not the fuzzy subset $P_j$ is a subset of the fuzzy subset Q. That is Block 10–2 checks to see if all of the following conditions are true:

$$P_{j1} \leq Q_1, P_{j2} \leq Q_2, \ldots, P_{jN} \leq Q_N$$

If any one of these inequalities fails to be true, then the entire test fails. If the test does not fail, then the weight $P_j$ which corresponds to the fuzzy subset $P_j$ is accumulated in Block 10–3:

new accumulant=$P_j$+old accumulant

Once all of the cycles in the control loop have been completed, the final value of the accumulant is stored as the prior-belief value $\beta(Q)$ of the fuzzy subset Q.

Block 11: "Squeeze" the new running estimate

This discussion refers to Block 11 in FIG. I and to FIG. VII. The input to this block is a fuzzy body of evidence B whose size is to be reduced. That is, B consists of an array $P_1, \ldots, P_s$ of fuzzy subsets of $\{O_1, \ldots, O_N\}$ together with an array $P_1, \ldots, P_s$ of numbers between zero and one (which sum to one). Each $P_j$ is an array $P_{j1}, \ldots, P_{jN}$ of numbers between zero and one. This block replaces B by successively smaller bodies of evidence $C_s, C_{s-1}, \ldots, C_e$=where $C_k$ has k hypotheses.

This block uses three control loops. The first loop, 11–1, runs over an index whose maximal value is s–$N_{hyp}$, the number of steps it takes to reduce the original fuzzy body of evidence B (which has s hypotheses) to Sq(B) (which has $N_{hyp}$ hypotheses). The remaining two loops, 11–2 and 11–4, run over the number of fuzzy subsets contained in C (where C denotes the current value of $C_k$ at any given stage). For each pair of values i,j in these latter two loops, the purpose of the succeeding code is to compute a smaller fuzzy body of evidence which minimizes an entropy metric constructed from the hypotheses in C. The fuzzy body of evidence C consists of an array $Q_1, \ldots, Q_1$ of fuzzy subsets of $\{O_1, \ldots, O_N\}$ together with an array $q_1, \ldots, q_1$ of numbers between zero and one (which sum to one). Each $Q_j$ is an array $Q_{j1}, \ldots, Q_{jN}$ of numbers between zero and one.

In Block 11–3, the nonnegative integer $N_i$ is computed. It is just the number of types in DBASE which are consistent with the hypothesis $Q_i$ of C. (A hypothesis Q is "consistent" with an entry µ in DBASE if it is an object which has the characteristics described by Q.) In Block 11–5, likewise, the number $N_{ij}$ is computed. It is the number of entries in DBASE which are consistent with the hypotheses $Q_i$ or $Q_j$.

In Block 11–6, the stored numbers $N_i$ and $N_{ij}$ are used to compute the approximate entropy value E. This is defined by $$E = (m_i + m_j)\ln\left(\frac{m_i + m_j}{N_{ij}}\right) - m_i\left(\frac{m_i}{N_i}\right) - m_j\left(\frac{m_j}{N_j}\right)$$

for all i≠j and i,j=1, ..., s. Then, in the decision node 11–7, the value E is compared with a stored minimal value $E_{min}$, the minimum entropy (which is initialized by setting $E_{min}$=a large number between loops 11–1 and 11–2). If E<$E_{min}$ then the value of $E_{min}$ is reset to E in Block 11–9 and the current values ij of the loop indices are stored in Block 11–8. Following the completion of loops 11–2 and 11–4, the value of C is reset to the "squeezed" fuzzy body of evidence $C_{ab}$, corresponding to the stored values of i=a, j=b which are left after completion of the loops. Here, $C_{ab}$ is the fuzzy body of evidence derived from C by striking out the hypotheses $Q_a$ and $Q_b$ from C and replacing them with the single hypothesis $Q_{ab}=Q_a$ or $Q_b$ Likewise, the rank $Q_{ab}$ is taken as $Rank(Q_{ab})=q_a+q_b$. ("or" here denotes the fuzzy OR)

In Block 11-10, the fuzzy body of evidence $C_{ab}$ is stored as the next value of C and the process continues as the process cycles to the next index of loop 11-1. When the last value in this loop has been reached (i.e., when the desired reduced number e of hypotheses has been attained) then the final value of C is stored for use as the "squeezed" value of the original fuzzy body of evidence B.

Block 12: Computation of fuzzy intersection of continuous attributes.

In the case of attributes which are discrete (see discussion in Block 1 above), the fuzzy intersection of two fuzzy subsets is simple. If $F_1, \ldots, F_d$ and $G_1, \ldots G_d$ are two arrays which represent two fuzzy subsets of the same family $\{Z_1, \ldots, Z_d\}$ of attribute possibilities, then the intersection is another fuzzy subset $H_1, \ldots, H_d$ of $\{Z_1, \ldots, Z_d\}$. This fuzzy subset is simply defined by the formula $$H_j = \min\{F_j, G_j\}$$

for all $j=1, \ldots, d$.

When attributes are continuous (see discussion in Block 1 above), however, the fuzzy intersection is more complex because of the special representation of fuzzy subsets in this case as trapezoids. In this case, the fuzzy intersection of two trapezoids must result in a new trapezoid. Since this is not true in general, an approximation is made to guarantee that the fuzzy intersection of two trapezoids will result in another trapezoid. Suppose that $$A_1 = (cl_1, cr_1, h_1, 1/ml_1, 1/mr_1)$$

$$A_2 = (cl_2, cr_2, h_2, 1/ml_2, 1/mr_2)$$

are trapezoids which represent fuzzy attributes. Then the default definition of the fuzzy intersection of $A_1$ and $A_2$ is the new attribute $$A = (cl, cr, h, 1/ml, 1/mr)$$

where $cl = \max\{cl_1, cl_2\}$
$cr = \min\{cr_1, cr_2\}$
$h = \min\{h_1, h_2\}$
$ml = ml_1$ (if $cl_1 > cl_2$)
$ml = ml_2$ (if $cl_2 > cl_1$)
$mr = mr_2$ (if $cr_1 > cr_2$)
$mr = mr_1$ (if $cr_2 > cr_1$)

Variations on this default definition are necessary for those special cases when $A_1$ lies within an extremity of $A_2$ or vice-versa. (Geometrically, our trapezoids consist of a right triangle followed by a rectangle following by another right triangle. The two right triangle of a trapezoid are its "extremities.")

EXAMPLE 1

Classification Using Three Object Types and Six Attributes

The intent and operation of the invention is best described using a simple example. In our example, the database DBASE consists of three (imaginary) new and rare diseases:

DBASE={KOTOSIS, PHLEGARIA, PINPOX} which we abbreviate as KOT, PHL, POX, respectively. In addition our database consists of six attributes as follows:

1) Basal temperature: FEVER, NORMAL, COLD

2) Skin tone: RASH, NORMAL, PALE

A fuzzy subset of diseases in DBASE is a function f which assigns real numbers in the set $\{0,\frac{1}{2},1\}$ to each of the three imaginary diseases: f(KOT)=a, f(PHL)=b, f(POX)=c. For simplification purposes it is desired to abbreviate such a fuzzy set by the ordered triple <a,b,c>. The fuzzy intersection of two such fuzzy sets <a,b,c,> and <a',b',c'> is the fuzzy set $$<a,b,c,> \cap <a',b',c'> = <\min\{a,a'\}, \min\{b,b'\}, \min\{c,c'\}>.$$

Likewise, a fuzzy subset of the basal temperature attribute set is a function g such that g(FEVER)=a, g(NORMAL)=b, g(COLD)=c for some numbers $0 \leq a,b,c, \leq 1$ (e.g., the abbreviated triple [a,b,c,]). Fuzzy subsets of the skin condition attribute set are likewise abbreviated as |a,b,c,|.

Each disease in DBASE has a signature or characteristic symptomatology. The diseases are rare and, as best as can be determined, the symptomatologies are as follows:

KOTOSIS symptomatology: [0,½,1], |1,½,½|

PHLEGARIA symptomatology: [1,½,0], |½,i½|

PINPOX symptomatology: [½,1,0], |½,½,1|

For example, in the case of KOTOSIS the fuzzy set [0,½,1] means that the basal temperature associated with KOTOSIS is usually a hypothermic ("cold") but there is some possibility that it will be normal. Likewise, the fuzzy set |1,½,½| means that KOTOSIS is usually accompanied by a skin rash, but there is some possibility that the skin can be normal or pale. The operator must specify the state of prior knowledge. Assume that the three diseases are equally likely to occur in the patient population. However, they are new diseases which may not necessarily be distinct. In fact, there is some evidence that PHLEGARIA and PINPOX may be the same disease. There is a small possibility that KOTOSIS and PHLEGARIA might be the same disease. Finally, there is a small possibility that all three diseases are actually the same. This information is expressed by assigning weights to fuzzy subsets of the diseases in DBASE, as follows:

1) $<1/2,0,0>:w = .2$  ("possibility that KOTOSIS is a distinct disease has weight .2")
2) $<0,1/2,0>:w = .2$  ("possibility that PHLEGARIA is a distinct disease has weight .2")
3) $<0,0,1/2>:w = .2$  ("possibility that PINPOX is a distinct disease has weight .2")
4) $<0,1/2,1/2>:w = .2$  ("possibility that PHLEGARIA and PINPOX are same disease has weight .2)
5) $<1/2,1/2,0>:w = .1$  ("possibility that KOTOSIS and PHLEGARIA are same disease has weight .1)
6) $<1,1,1>:w = .1$  ("possibility that *KOTOSIS, PHLEGARIA, PINPOX are same disease* has weight .1)

Mathematically, this information can be abbreviated by writing it as a weighted sum:

$$PRIOR = 0.2<1/2,0,0> + 0.2<0,1/2,0> + 0.2<0,0,1/2> + 0.2<0,1/2,1/2> + 0.1<1/2,1/2,0> + 0.1<1,1,1>$$

Now, assume that two physicians examine a patient and report the following symptoms. Doctor B reports that the patient definitely has a fever, and is extremely confident that he has examined the patient correctly. Doctor C was forced to examine the patient hurriedly. This doctor reports that the patient probably has a rash, though possibly not, but that he could be entirely mistaken. The two observations could be represented mathematically as follows:

Doctor B: $[1,0,0]:.95$  ("certainly has a fever, 95% certain of examination")
$[1,1,1]:.05$  ("5% chance of mistaken observation")
Doctor C: $[1,1/2,0]:.8$  ("probably a rash but maybe normal, only 80% certain")
$[1,1,1]:.2$  ("20% chance of mistaken observation--I was in a hurry")

These reports can also be represented as weighted sums:
Doctor B's report: $0.95[1,0,0] + 0.05[1,1,1]$
Doctor C's report: $0.80|1,1/2,0| + 0.20|1,1,1|$ Given the reports of these two doctors, the operator wants the computer system to answer the following question: What disease does the patient most likely have?

The computer system methodology begins by determining the two fuzzy subsets of DBASE which are consistent with the two observations. In regard to basal temperature, recall that the signatures of the three diseases are as follows:

KOTOSIS: $[0,1/2,1]$
PHLEGARIA: $[1,1/2,0]$
PINPOX: $[1/2,1,0]$

Taking the fuzzy intersection of Doctor B's report $0.95[1,0,0]+0.05[1,1,1]$ with the basal temperature attribute $[0,1/2,1]$ for KOTOSIS the process generates:

$(.95[1,0,0] + .05[1,1,1]) \wedge [0,1/2,1] =$ $.95([1,0,0] \wedge [0,1/2,1]) + .05([1,1,1] \wedge [0,1/2,1]) =$ $.95[0,0,0] + .05[0,1/2,1]$ Likewise, taking the fuzzy intersection of Doctor B's report with the basal temperature attribute $[1,1/2,0]$ PHLEGARIA the process generates:

$(0.95[1,0,0]+0.05[1,1,1]) \wedge [1,1/2,1,0] = 0.95[1/2,0,0]+0.05[1/2,1,0]$

Thus the process produces the following fuzzy body of evidence of diseases (representation of Doctor B's report):

$0.95<0,1,1/2> + 0.05<1,1,1>$ where $<0,1,1/2>$ was obtained by $0 = \max \{0,0,0\}$  (KOTOSIS)
$1 = \max \{1,0,0\}$  (*PHLEGARIA*)
$1/2 = \max \{1/2,0,0\}$  (PINPOX)

and where in $<1,1,1>$ was obtained likewise by $1 = \max \{0,1/2,1\}$  (KOTOSIS)
$1 = \max \{1,1/2,0\}$  (PHLEGARIA)
$1 = \max \{1/2,1,0\}$  (PINPOX)

If the computer system repeats this procedure for Doctor C's report the process finds that:

$(.80|1,1/2,0| + .20|1,1,1|) \wedge |1,1/2,1/2| = .81|1,1/2,0| + .21|1,1/2,1/2|$
Likewise,
$(.80|1,1/2,0| + .20|1,1,1|) \wedge |1/2,1,1/2| = .8|1/2,1/2,0| + .2|1/2,1,1/2|$
and
$(.80|1,1/2,0| + .20|1,1,1|) \wedge |1/2,1/2,1| = .8|1/2,1/2,0| + .2|1/2,1/2,1|$ Thus the fuzzy body of evidence of diseases which is consistent with Doctor C's report is:

$0.8<1,1/2,1/2>+0.2<1,1,1>$

The computer-based process then determines the state of agreement between the doctors's reports
B: $0.95<0,1,1/2>+0.05<1,1,1>$
C: $0.80<1,1/2,1/2>+0.20<1,1,1,>$
By definition this is:

$\alpha(B,C) = .76\ \alpha(<0,1,1/2>, <1,1/2,1/2>) +$
$.19\ \alpha(<0,1,1/2>, <1,1,1>) + .04\ \alpha(<1,1,1>, <1,1/2,1/2>) +$
$.01\ \alpha(<1,1,1>, <1,1,1>)$ The final three terms are easy to compute since, for any fuzzy subset $<a,b,c>$ we get:

$$\alpha(<a,b,c>,<1,1,1>) = \frac{\beta(<a,b,c> \wedge <1,1,1>))}{\beta(<a,b,c>)\beta(<1,1,1>)} =$$

$$\frac{\beta(<a,b,c>)}{\beta(<a,b,c>)\beta(<1,1,1>)} = \frac{1}{\beta(<1,1,1>)} = 1$$

On the other hand, computer system must compute $$\alpha(<0,1,1/2>,<1,1/2,1/2>) = \frac{\beta(<0,1,1/2> \wedge <1,1/2,1/2>))}{\beta(<0,1,1/2>)\beta(<1,1/2,1/2>)} =$$

$$\frac{\beta(<0,1/2,1/2>)}{\beta(<0,1,1/2>)\beta(<1,1/2,1/2>)}$$

so that we must compute $\beta(<0,1/2,1/2>)$, $\beta(<0,1,1/2>)$ and $\beta(<1,1/2, 1/2>)$. However, recall that our prior knowledge has the form PRIOR=0.2<1/2,0,0>+0.2<0,1/2,0>+0.2<0,0,1/2>+0.2<0,1/2,1/2>+0.1<1/2,1/2,0>+0.1<1,1,1>

The fuzzy sets of this prior that are contained in <0,1/2,1/2> are

<0,1/2,0>, <0,0,1/2>, <0,1/2,1/2> with weights 0.2, 0.2 and 0.2, respectively. (For example, <0,1/2,0> is contained in >0,1/2,1/2> because 0≦0, 1/2≦1/2, 0≦1/2)Thus $$\beta(<0,1/2,1/2>)=0.2+0.2+0.2=0.6$$

Likewise, the fuzzy sets of the prior that are contained in <0,1,1/2> are the same as before, so that $\beta(<0,1,1/2>)=0.6$. Finally, all of the fuzzy subsets of the prior are contained in <1,1/2,1/2> except for <1,1,1>. Thus $\beta(<1,1/2,1/2>)=0.9$. Hence, $$\alpha(<0,1,1/2, <1,1/2,1/2>)=1 1.9=1.11$$

and so the process finally produces an agreement value $$\alpha(B,C)=(0.76)(1.11)+0.19+0.04+0.01=1.09$$

Thus $\alpha(B,C)>1$ and there is a state of agreement between B and C. The computer system is thus allowed to combine B and C to get a combined report. Next, the process generates the combined fuzzy body of evidence $B*_\pi C$. This is accomplished by $$\alpha(B,C)(B *_\pi C) = .84(<0,1,1/2>) \wedge <1,1/2,1/2>) +$$
$$.19(<0,1,1/2> \wedge <1,1,1>) +$$
$$.04(<1,1,1> \wedge <1,1/2,1/2>) + .01(<1,1,1> \wedge <1,1,1>) =$$
$$.84<0,1/2,1/2> + .19<0,1,1/2> + .04<1,1/2,1/2>) +$$
$$.01<1,1,1>$$

Normalizing by $\alpha(B,C)$ the system produces the combined report:

$$B *_\pi C = .78<0,1/2,1/2> + .17<0,1,1/2> +$$
$$.04<1,1/2,1/2>) + .01<1,1,1>$$

The system can compute the agreement of this quantity with each of the diseases KOT, PHL and POX to determine which disease best describes the composite piece of evidence. First, for KOTOSIS:

$$\alpha(B *_\pi C, <1,0,0>) = .78\alpha(<0,1/2,1/2>,<1,0,0>) +$$
$$.17\alpha(<0,1,1/2>,<1,0,0>) +$$
$$.04\alpha(<1,1/2,1/2>,<1,0,0>) + .01\alpha(<1,1,1>,<1,0,0>) =$$
$$.04\alpha(<1,1/2,1/2>,<1,0,0>) + .01\alpha(<1,1,1>,<1,0,0>) =$$
$$(.04)(1.11) + .01 = .05$$

Second, for PHLEGARIA:

$$\alpha(B *_\pi C, <0,1,0>) = .78\alpha(<0,1/2,1/2>,<0,1,0>) +$$
$$.17\alpha(<0,1,1/2>,<0,1,0>) +$$
$$.04\alpha(<1,1/2,1/2>,<0,1,0>) + .01\alpha(<1,1,1>,<0,1,0>) =$$
$$(.78)(1.666) + (.17)(1.666) +$$
$$(.04)(1.111) + 1 = 2.63$$

Third, for PINPOX the system produces the same digital result as for PHLEGARIA:

$$\alpha(B *_\pi C, <0,0,1>) = .78\alpha(<0,1/2,1/2>,<0,0,1>) +$$
$$.17\alpha(<0,1,1/2>,<0,0,1>) +$$
$$.04\alpha(<1,1/2,1/2>,<0,0,1>) + .01\alpha(<1,1,1>,<0,0,1>) =$$
$$(.78)(1.666) + (.17)(1.666) +$$
$$(.04)(1.111) + 1 = 2.63$$

Or in summary the computer system can display to an operator the following results.

$$\alpha(B *_\pi C, KOT) = .05$$
$$\alpha(B *_\pi C, PHL) = 2.63$$
$$\alpha(B *_\pi C, POX) = 2.63$$

Thus, on the basis of the evidence presented by Doctor B and Doctor C the system and method of the present invention is able to conclude that the patient does not have KOTOSIS. The evidence is too equivocal, however, for the system and method to be able to decide between PHLEGARIA and PINPOX.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A software algorithm process for operating a digital computer to probabilistically identify an object of unknown identity, whose possible identities are possibly subjective based on evidence that is also possibly subjective, wherein said algorithm employs input data information from external data sources and stored database information; wherein the said stored database information comprises:

A. an array representative of the possibly subjective object types that identify the possible identities of an observed object of unknown identity, and wherein said object types form a fuzzy body of evidence, B. an array of object attributes arranged into attribute families which are believed to be observed from said object of unknown identity, each of which is a fuzzy subset of the total set of possible object types available to the attribute family to which it belongs, and C. a signature collection representative of the possibly subjective attributes which are believed to be characteristic of the possible and possibly subjective object types, wherein said process comprises the steps of:

(1) obtaining said input data information which is descriptive of observed attributes that are believed to be associated with said object of unknown identity, and (2) translating said input data information into a fuzzy body of evidence by computing:

(a) the belief that the observed attributes belong to a specified family of attributes, (b) the belief in the existence of the observed object attributes, and
  (i) the belief that the observed object attribute belongs to a specified family of attributes,
  (ii) the belief in the existence of the observed object attribute, and
  (iii) the degree of belief that attributes in the specified attribute family could be the observed object attribute,
(c) determining a running average of fuzzy bodies of evidence from said input data information which is consistent with said stored database information and is a running average fuzzy body of evidence itself,
(d) computing the probability agreement between said running average fuzzy body of evidence and said stored database information,
(e) combining combinable input data information and said stored database information and said running average fuzzy body of evidence,
(f) selecting the maximal alternative object type of said database by computing a posterior probability distribution of said possibly subjective object types and determining its maximal value,
(g) computing belief in defined fuzzy propositions,
(h) reducing the size of said running average fuzzy body of evidence, and
(i) computing the fuzzy intersections between said observed attributes and said signature attributes.

* * * * *

UNITED STATES PATENT AND TRADEMARK OFFICE
CERTIFICATE OF CORRECTION

PATENT NO. : 5,748,852
DATED : May 5, 1998
INVENTOR(S) : Ronald P. S. Mahler

It is certified that error appears in the above-indentified patent and that said Letters Patent is hereby corrected as shown below:

Column 17 line 66 insert --
    Finally, taking the fuzzy intersection of Doctor B's report with the basal temperature attribute [½,1,0] for PINPOX the process generates:

$$(.95[1,0,0] + .05[1,1,1]) \wedge [½,1,0]$$
$$= .95[½,0,0] + .05[½,1,0]$$

Signed and Sealed this

Thirtieth Day of June, 1998

Attest:

BRUCE LEHMAN

Attesting Officer

Commissioner of Patents and Trademarks